United States Patent
Bae (10) Patent No.: US 6,669,640 B2
(45) Date of Patent: Dec. 30, 2003

(54) ULTRASOUND IMAGING SYSTEM USING MULTI-STAGE PULSE COMPRESSION

(75) Inventor: Moo Ho Bae, Seoul (KR)

(73) Assignee: Medison Co., Ltd., Kangwon-Do (KR)

( * ) Notice: Subject to any disclaimer, the term of this patent is extended or adjusted under 35 U.S.C. 154(b) by 0 days.

(21) Appl. No.: 10/236,424

(22) Filed: Sep. 5, 2002

(65) Prior Publication Data

US 2003/0045794 A1 Mar. 6, 2003

(30) Foreign Application Priority Data

Sep. 5, 2001 (KR) .......................... 2001-54317

(51) Int. Cl.[7] .............................................. A61B 8/00
(52) U.S. Cl. ....................................... 600/447; 600/443
(58) Field of Search ................................. 600/437, 447, 600/443, 444, 445, 448, 449, 440–441, 456, 458, 455; 128/916; 73/625

(56) References Cited

U.S. PATENT DOCUMENTS

| | | | | |
|---|---|---|---|---|
| 6,048,315 A | * | 4/2000 | Chiao et al. | 600/447 |
| 6,155,980 A | * | 12/2000 | Chiao et al. | 600/447 |
| 6,213,946 B1 | * | 4/2001 | Brock-Fisher | 600/443 |
| 6,213,947 B1 | * | 4/2001 | Phillips | 600/443 |
| 6,241,674 B1 | * | 6/2001 | Phillips et al. | 600/443 |
| 6,312,384 B1 | * | 11/2001 | Chiao | 600/443 |
| 6,350,240 B1 | * | 2/2002 | Song et al. | 600/443 |

* cited by examiner

*Primary Examiner*—Francis J. Jaworski
*Assistant Examiner*—Ruby Jain
(74) *Attorney, Agent, or Firm*—Thelen Reid & Priest LLP; David B. Ritchie (57) ABSTRACT

Disclosed is an ultrasound imaging system based on a multi-stage pulse compression and multi-stage time delaying scheme. In the ultrasound imaging system, a transducer array is grouped into a predetermined number of transducer groups, and the grouped ultrasound signals are processed hierarchically via multi-stage pulse compression and multi-stage time delaying operations so that a finely receive-focused ultrasound signal can be obtained.

12 Claims, 6 Drawing Sheets

ULTRASOUND IMAGING SYSTEM USING MULTI-STAGE PULSE COMPRESSION

FIELD OF THE INVENTION

The present invention relates to an ultrasound imaging system, and more particularly, to an ultrasound imaging system having an efficient hardware structure and capable of providing a high-resolution ultrasound image by adopting a multi-stage pulse compression scheme.

BACKGROUND OF THE INVENTION

The ultrasound imaging system is widely used in the medical field for the purpose of displaying a sliced image (ultrasound image) of a "target object" such as an internal organ of a human body. In such ultrasound imaging systems, an ultrasound image is formed by transmitting ultrasound signals towards the target object, receiving the signals reflected from the target object, more specifically, from a surface of the target object (e.g., an interface between skin and subcutaneous fat, between subcutaneous fat and abdominal muscles, etc., where the acoustic impedance is discontinuous), and converting the received ultrasound signals into electrical signals. For ultrasound signal transmission purposes, the ultrasound imaging system uses a transducer and a pulser for driving the transducer. The transducer generates ultrasound signals in response to a pulse applied from the pulser.

Most of the conventional state of the art ultrasound imaging systems employ a short pulse as ultrasound transmission signals. In such systems, the power of the signals received at the transducer is remarkably lowered since the transmitted ultrasound signal undergoes severe attenuation when passing through a highly dense medium, such as the human body. As a result, obtaining the desired information on the target object, e.g., in cases where the target object is located deep inside a body, becomes difficult. Increasing the peak voltage of the pulse being transmitted may solve the problems associated with the attenuation of the ultrasound signals. However, there is a certain limitation to increasing the peak voltage of the pulse, since this may affect the internal organs of the human body.

Instead of increasing the peak voltage of the pulse, the average power of the pulses can be raised. As a result, the Signal to Noise Ratio (SNR) can be improved remarkably. This method is called "pulse compression," and is used, for example, in radar equipment. An ultrasound imaging system of the type that employs pulse compression normally uses a coded long pulse having a long duration instead of the conventional short pulse. In this type of ultrasound imaging systems, the resolution in the direction of ultrasound wave propagation, the "axial resolution," is determined by the convolution taken between the characteristic function of the transducer and the coded long pulse, in contrast to a conventional system employing short pulses of high peak voltage where the axial resolution is determined by the impulse response characteristics of the transducer. Therefore, in order to avoid the degradation of the axial resolution that may be caused by the use of the coded long pulse, such ultrasound imaging apparatuses use a correlator-based pulse compressor that takes a cross-correlation between the received ultrasound signal and the coded long pulse as transmitted. Using the correlation at the pulse compressor can prevent degradation of the axial resolution, allowing the same level of resolution to be maintained as if a short pulse were transmitted. Accordingly, a relatively low voltage of the long duration can be advantageously used without sacrificing the SNR.

Additionally known in the art, ultrasound imaging systems may also be based on a phased array. Such an ultrasound imaging system includes a plurality of channels, each channel including a transducer, a transmitter (i.e., pulser) and a receiver coupled to the transducer. The transmitter functions to transmit ultrasound signals (or pulses) towards the target object such as a human body. Note that the transmitters at the plurality of channels do not transmit ultrasound signals at the same time. Instead, they transmit the ultrasound signals with a different timing so that the ultrasound signals as transmitted from the transmitters reach a desired position within the target object at the same time, thereby being transmit-focused at a predetermined location within the target object. The transmitted ultrasound pulses pass through various internal organs of the human body and are reflected from a certain portion of the internal organs and directed to the transducer array.

The ultrasound signals reflected from the target object are received by the transducer array and are converted into electric signals. The time when the reflected signals reach each of the transducers varies depending on the location of each transducer in the array relative to the target object. That is, the farther away from the center position of the array the transducer is located, the more time period is required for the ultrasound signals to reach the transducer. In order to compensate for the differences in arrival time among the transducers, a beamformer is used to receive focus the converted electrical signals. The beamformer incorporates appropriate time delays into the electrical signals, which correspond to the received ultrasound signals, giving rise to the same effects as if all the transducers receive the reflected signals at the same time. The time delays as applied by the beamformer vary depending on the depth of the reflecting surface of the target object and the locations of the transducers.

The beamformer is further explained below with reference to FIG. 1, which illustrates the structure of a beamformer in a conventional ultrasound imaging system. As shown, beamformer 100 comprises transducer array 10 including a plurality of transducers, delay stage 11 comprised of a corresponding number of delay elements $DLY_1$–$DLY_{64}$ to the transducers, adder 12, and pulse compressor 13 connected to the output terminal of adder 12. The reflected ultrasound signals are converted to electric signals at the transducers and are transmitted to delay stage 11. Each delay element at delay stage 11 compensates the input signals by a predetermined time delay depending on the location of the corresponding transducer relative to the center of transducer array 10. Therefore, the differences in arrival time among the transducers can be compensated by the use of delay elements, which are connected to the output terminals of the transducers. The delay-processed signals from delay elements $DLY_1$–$DLY_{64}$ are added together in adder 12. Pulse compressor 13 pulse-compresses the output signal from adder 12. According to the beamformer of FIG. 1, the system configuration can be simplified, but problems arise where the beamformer of FIG. 1 adopts dynamic receive-focusing. If receive-focusing is performed dynamically in the beamformer of FIG. 1 where pulse compression occurs after receive-focusing, delay times necessary for receive-focusing may be inaccurately computed, as explained below.

Figure 1:
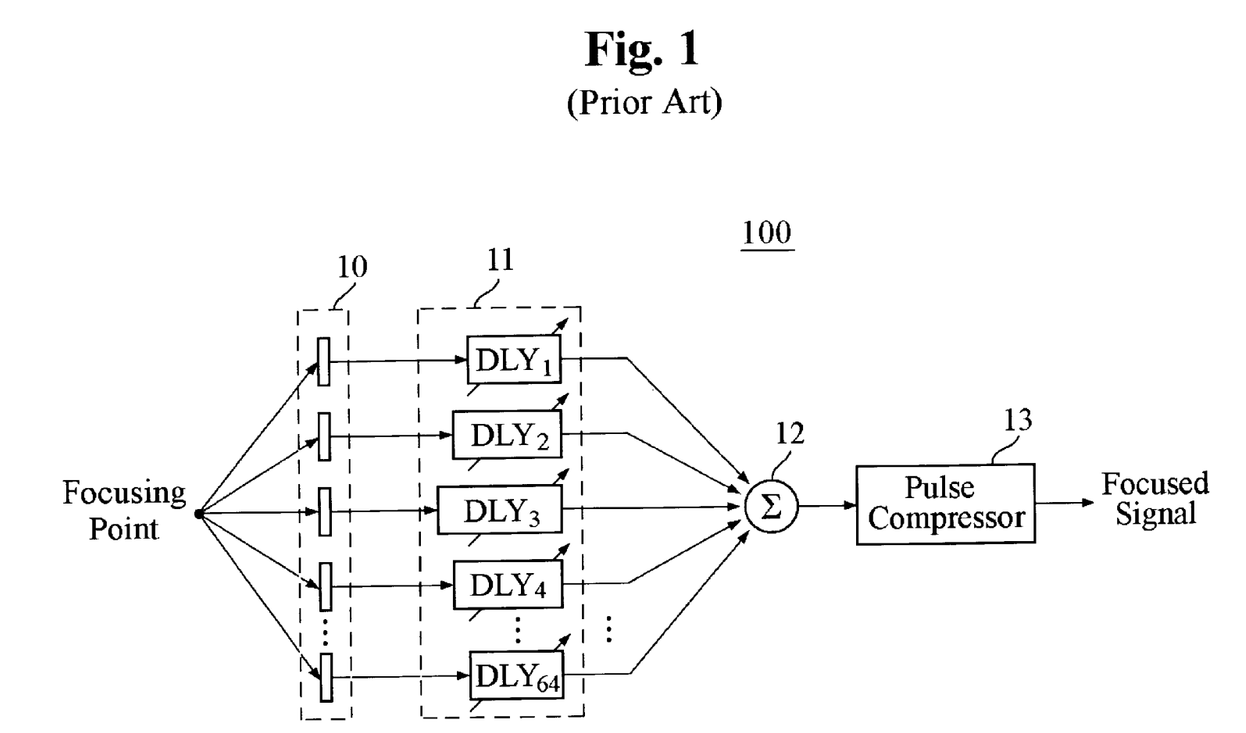
FIG. 1 illustrates the structure of a beamformer of a conventional ultrasound imaging system, in which a pulse compressor is connected to an output terminal of an adder.

Preferably, the beamformer of FIG. 1 may adopt dynamic receive focusing, according to which a focusing point is dynamically changed while the ultrasound signals are propagating through the human body. According to the dynamic receive-focusing, the time delay value for the center transducer is fixed to a predetermined value. For some transducers adjacent to the center transducer, the time delay is controlled to be shorter than the fixed time delay for the center transducer. For the remaining transducers far from the center transducer, the time delay is controlled to be close to the fixed time delay of the center transducer. With the dynamic receive-focusing, the time delays for the transducers are continuously controlled to ensure that the signals reflected from the same focusing point can be summed. As a result, the time delays for the outside transducers transition from a low to high value, as the receive-focusing operation proceeds. Therefore, the ultrasound signals from the outside transducers are distorted as if their frequencies were lowered.

Turning again to the problems encountered with the beamformer of FIG. 1, the center transducer incurs no problem with the calculation of the delay time value even under the dynamic receive-focusing situation, since there is no time distortion in the ultrasound signals arriving at the center transducer. However, in the case of the outside transducers other than the center transducer, time distortion is inevitably caused by the dynamic receive-focusing so that pulse compressor 13 inevitably performs incomplete pulse compression. Because of the incomplete pulse compression, side lobes appear at an undesired position in the axial direction or the main lobes become wider, thereby degrading the ultrasound image quality. Particularly, the time distortion problem becomes severe when the focusing point is located near the transducers.

Figure 2:
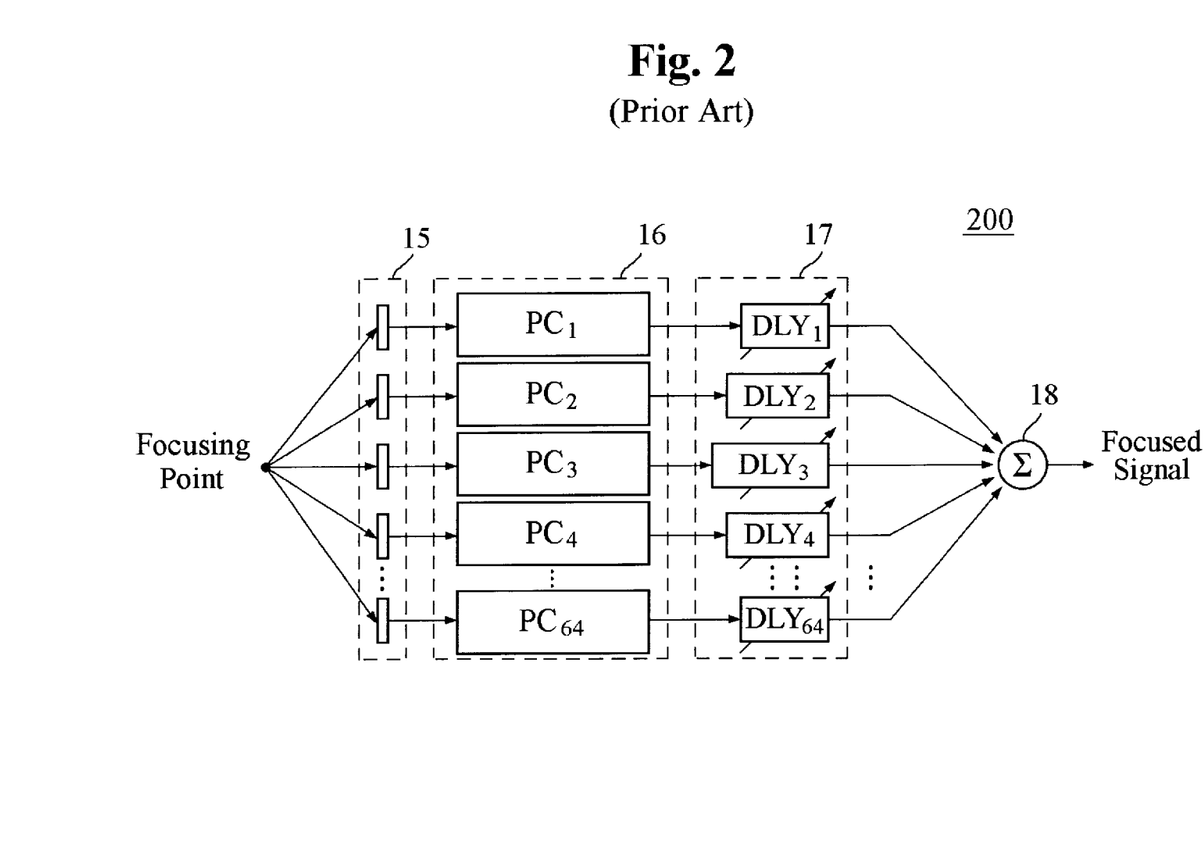
FIG. 2 illustrates the structure of a beamformer of another conventional ultrasound imaging system, in which one pulse compressor is connected to each channel of a transducer array.

In order to solve the aforementioned problems, a slightly different beamformer arrangement from that of FIG. 1 is proposed which is shown in FIG. 2, in which one pulse compressor is connected to each channel of the transducer array. As shown, beamformer 200 comprises transducer array 15 having 64 transducers, pulse compressor section 16 having 64 pulse compressors $PC_1$–$PC_{64}$ each connected to the respective transducer, delay section 17 having 64 delay elements $DLY_1$–$DLY_{64}$ each connected to the respective pulse compressor, and adder 18. While one pulse compressor 13 is connected to the output terminal of adder 12 in FIG. 1, pulse compressors $PC_1$–$PC_{64}$ are connected between the transducers and delay elements $DLY_1$–$DLY_{64}$, according to the beamformer structure shown in FIG. 2. Therefore, pulse compressor section 16 of FIG. 2 pulse-compresses the output signals from the transducers before dynamically receive-focusing or variable-delaying them in delay section 17, thereby preventing an inaccurate calculation. However, the system of FIG. 2 has drawbacks in that it must include many pulse compressors with complex hardware structure, making the entire system configuration complicated and limiting the degree of integration at the hardware level. The complexity of the system further increases as the number of probes and transducers required for a particular application increases. Moreover, the frame rate is degraded due to the delaying and pulse compression operations that are needed for every channel.

SUMMARY OF THE INVENTION

It is, therefore, an objective of the present invention to provide an improved ultrasound imaging system that can reduce the necessary hardware size while providing a high-resolution ultrasound image.

According to one aspect of the present invention, an ultrasound imaging system for forming an ultrasound image is provided which comprises a transducer array, N number of first delay groups, N number of first adders, N number of pulse compressors, N number of second delay elements, and at least one second adder, wherein N is an integer more than 1. The transducer array is divided into N number of transducer groups. Each of the transducer groups includes M number of transducers, wherein M is an integer more than 1. The transducers function to convert incoming ultrasound signals into electric signals. Each of the N number of first delay groups includes M number of first delay elements wherein the first delay elements are connected to the respective transducers to delay the electric signals from the transducers by a first time delay. Each of the N number of first adders operates to add the M number of delayed signals from the respective first delay group. The N number of pulse compressors are respectively connected to the N number of first adders for pulse-compressing the added signals from the first adders. The N number of second delay elements are respectively connected to the N number of pulse compressors for delaying the pulse-compressed signals by a second time delay. The at least one second adder adds the delayed signals from the second delay elements to generate a receive-focused signal.

According to another aspect of the present invention, an ultrasound imaging method for forming an ultrasound image is provided which comprises the steps of transmitting ultrasound signals towards a target object using a transducer array, the transmitted ultrasound signals being reflected from the target object, receiving the reflected ultrasound signals, dividing the received ultrasound signals into N number of groups, and time-delaying and pulse-compressing the signals from the N number of groups.

BRIEF DESCRIPTION OF DRAWINGS

The above and other objects and features of the present invention will become apparent from the following descriptions of the embodiments of the present invention given in conjunction with the accompanying drawings, in which.

DETAILED DESCRIPTION OF THE PRESENT INVENTION

Figure 3:
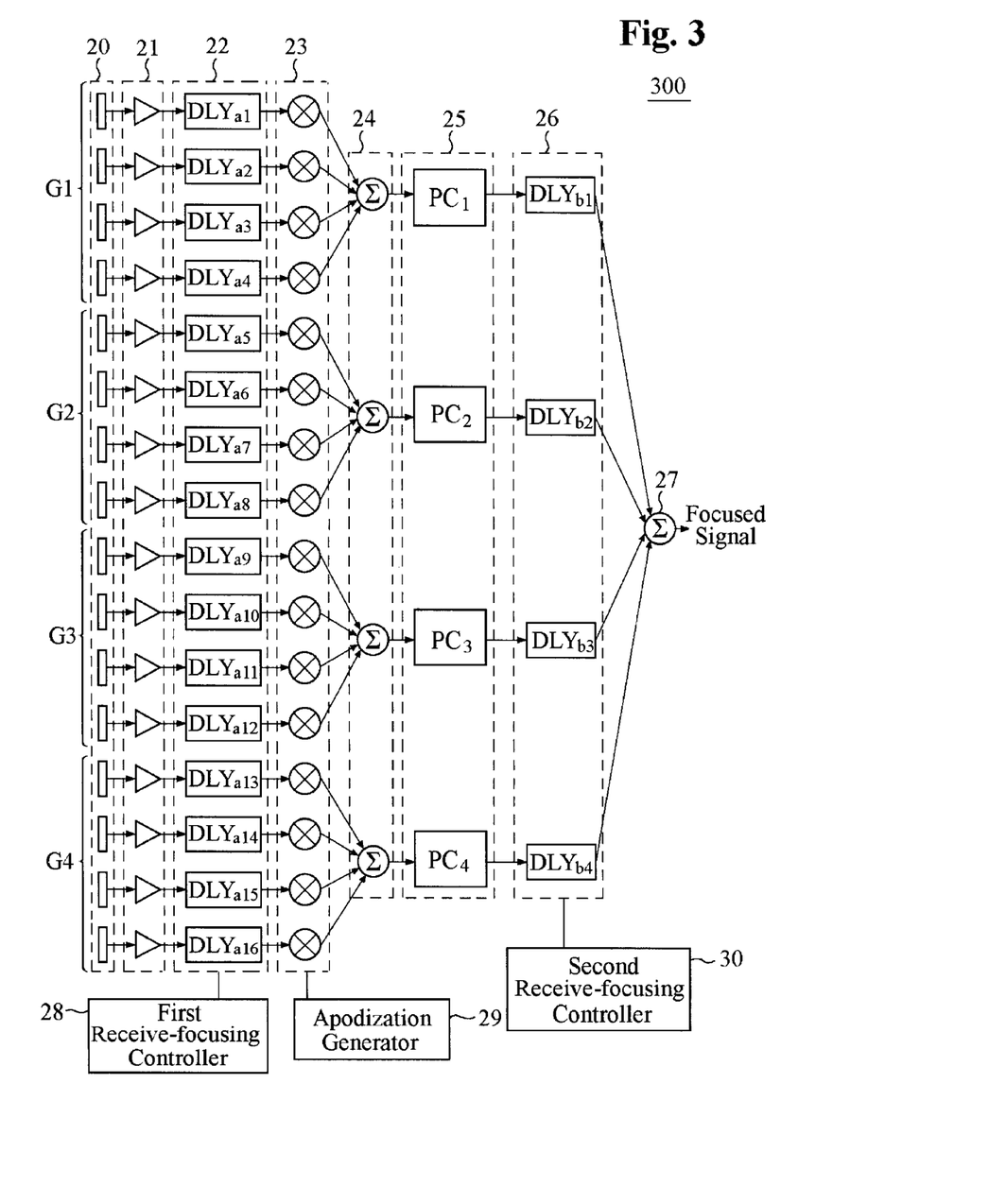
FIG. 3 illustrates the structure of a beamformer of an ultrasound imaging system in accordance with a first embodiment of the present invention, in which transducers are grouped into a predetermined number of groups and one pulse compressor is connected to an output terminal of each group.

Referring to FIG. 3, there is shown the structure of a beamformer of an ultrasound imaging system that employs a multi-stage pulse compression scheme in accordance with a first embodiment of the present invention. Beamformer 300 receives output signals from 16 channels (i.e., 16 transducers) and provides interim data for forming N number of beams or scan lines, preferably 16. Four of the beamformers as shown in FIG. 3 are needed for a system that performs beam-focusing based on 64 channels. Beamformer 300 comprises transducer array 20 having 16 transducers, receiver section 21 having 16 reception elements, first delay section 22 having 16 delay elements $DLY_{a1}$–$DLY_{a16}$, apodization section 23 having 16 apodization elements, first adder section 24 having 4 first adders, pulse compressor section 25 having 4 pulse compressors $PC_1$–$PC_4$, second delay section 26 having 4 delay elements $DLY_{b1}$–$DLY_{b4}$, second adder 27, first receive-focusing controller 28, apodization generator 29, and second receive-focusing controller 30.

Each of the 16 transducers in transducer array 20 transmits an ultrasound pulse in response to a voltage from a pulser associated therewith, and receives the ultrasound signals reflected from the target object. Some of the transducers are used in the first instance of ultrasound transmission. For example, for an ultrasound imaging system including 128 transducers, 64 transducers are selected in the first instance of ultrasound transmission. Transducer array 20 is divided into four groups G1–G4 each including a predetermined number of adjacent transducers that cause a similar degree of time distortion. A reference transducer may be selected from among the transducers within each group. The size of each group and the reference transducer may be selected to minimize a maximum or root mean square value of the absolute differences among the time distortions associated with the transducers. Even though the 4 transducers have been grouped into one group in this embodiment, one skilled in the art may appreciate that the number of transducers in one group may vary between 4 and 8 depending on a particular application.

Receiver section 21 serves to amplify the analog signals from transducer array 20 and to convert them into digital signals. For such purposes, receiver 21 may include a pre-amplifier, a Time Gain Compensation (TGC), and an Analog-to-Digital Converter (ADC) (not shown). Since transducer array 20 is comprised of four groups G1–G4, receiver section 21 is also comprised of four groups.

First delay section 22, also comprised of four groups as shown in FIG. 3, receives the digital signals from receiver section 21 and delays them by a first time delay which may differ for each transducer. Preferably, first receive-focusing controller 28 may pre-calculate and store the first time delay based on the relative locations of the transducers and the point of reflection of the ultrasound signals in the target object. Although only one first receive-focusing controller 28 is illustrated as connected to first delay section 22 in this embodiment, the first receive-focusing controller may be included for each group of first delay section 22.

Apodization section 23 multiplies predetermined weights (i.e., apodization coefficients) to the output signals from first delay section 22 in a conventional manner, thereby improving the image resolution in the lateral direction. The weights applied to the output signals from first delay section 22 may differ from each other. In this case, the weights (apodization coefficients) may be determined according to predetermined apodization curve pattern data that is pre-stored in an apodization curve memory (not shown) included in apodization generator 29. Although only one apodization generator 29 is illustrated as connected to first apodization section 23, each group of apodization section 23 may employ a separate apodization generator.

In first adder section 24, the output signals from apodization section 23 are added for each of groups G1–G4. For example, the 4 output signals from the 4 apodization elements, which belong to group G1, are added together by one of the first adders shown in FIG. 3.

Pulse compressor section 25, comprised of four pulse-compressors $PC_1$–$PC_4$ (one pulse compressor per group), pulse-compresses the summed signals from first adder section 24. Each pulse-compressor within pulse compressor section 25 pulse-compresses the summed signal from each first adder within first adder section 24, and takes a convolution operation with respect to data corresponding to each scan line by using a correlator (not shown), thus reducing sidelobes of the ultrasound signals.

Second delay section 26, comprised of 4 delay elements $DLY_{b1}$–$DLY_{b4}$, delays the pulse-compressed signals from pulse compressor section 25 by a second time delay which may differ for each group. The second time delay may also be pre-calculated by second receive-focusing controller 30 in a similar way to the first time delay. Second delay section 26 compensates for the differences in delay time among the groups to provide compensated signals. Finally, second adder 27 adds the output signals from second delay section 26, and outputs a receive-focused ultrasound signal. Thereafter, the receive-focused ultrasound signals are displayed on a display such as a monitor in a conventional manner.

As can be seen from FIG. 3, there are a total of 16 signal paths for the ultrasound signals (4 groups multiplied by 4 paths per group of transducer array 20) until the ultrasound signals reach first adder 24. As the 4 ultrasound signals from each group are added in the first adder to produce one signal, the 16 ultrasound signal paths are integrated into four signal paths. These four signal paths are then further integrated into one signal path by second adder 27. In this fashion, the signals from all the 16 channels are processed in group units and are ultimately integrated into a single output.

Figure 4A:
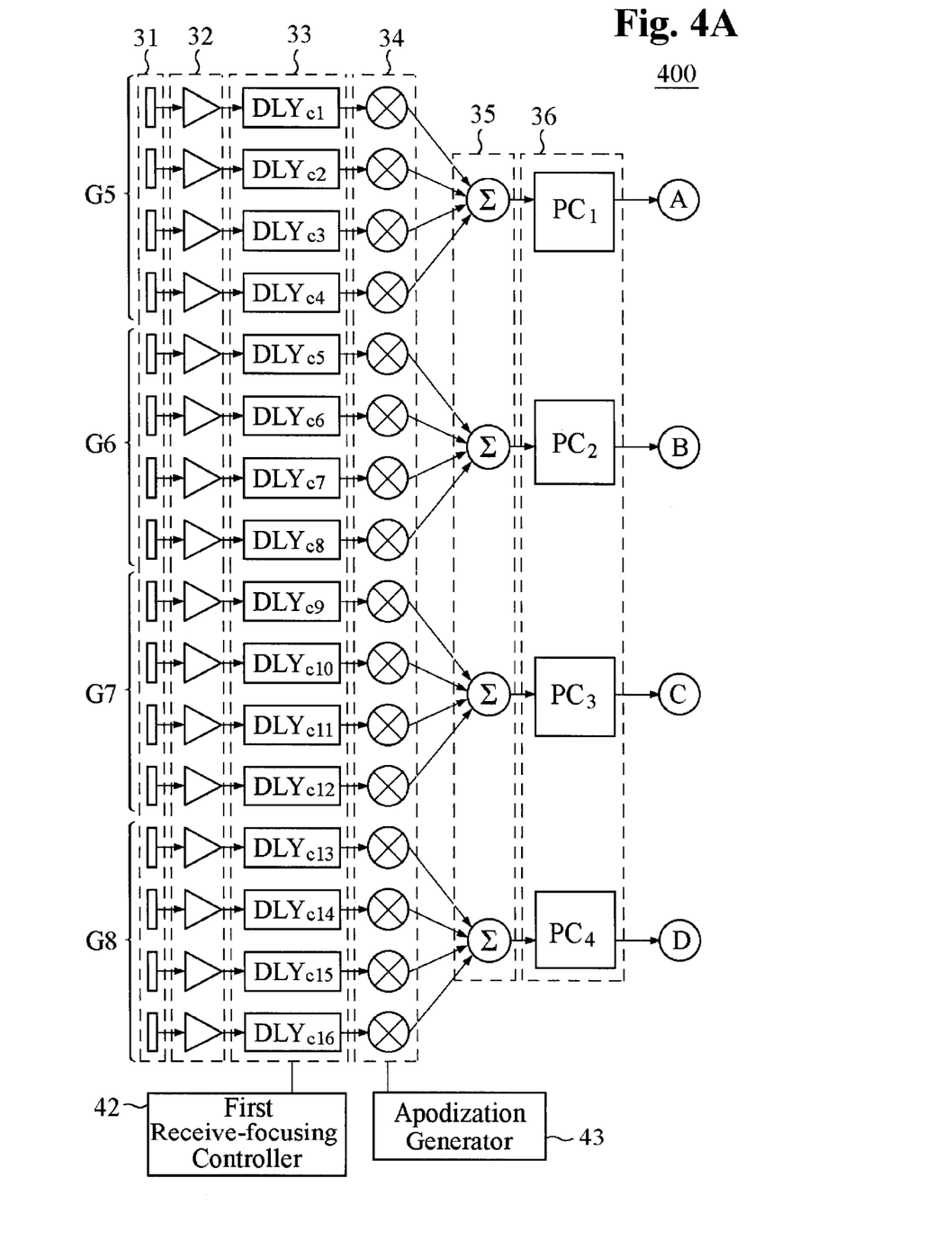
FIGS. 4A and 4B illustrate the structure of a beamformer of an ultrasound imaging system that employs a multi-stage pulse compression scheme in accordance with a second embodiment of the present invention.
Figure 4B:
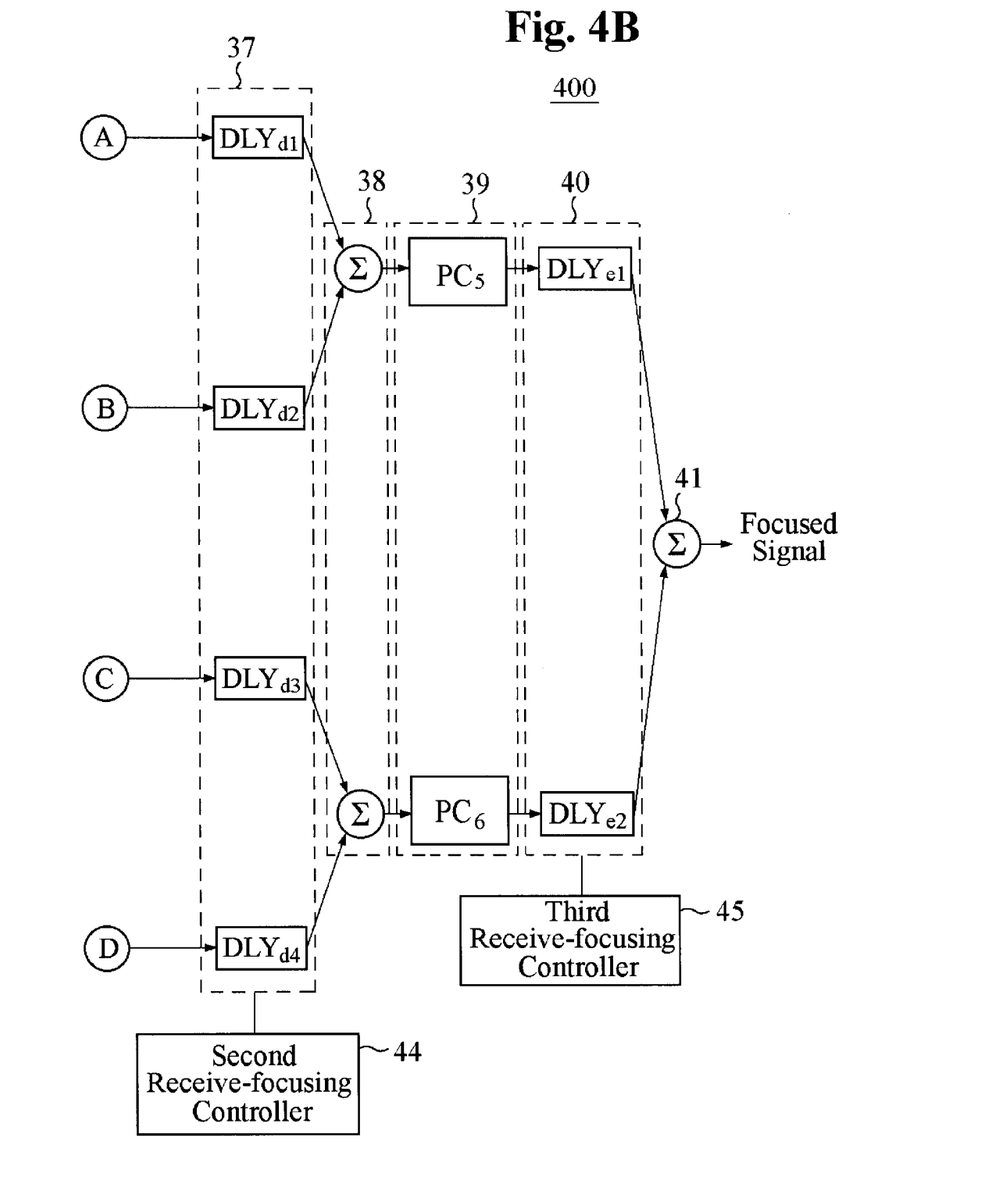

FIGS. 4A and 4B illustrate the structure of a beamformer of an ultrasound imaging system that employs a multi-stage pulse compression scheme in accordance with a second embodiment of the present invention. The structure of a beamformer 400 of FIGS. 4A and 4B is similar to that shown in FIG. 3 in that the signal paths originating from the transducer array are grouped into four groups. Transducer array 31, receiver section 32, first delay section 33, apodization section 34, first adder section 35, first pulse compressor section 36, and second delay section 37 in FIG. 4 are identical to the respective ones shown in FIG. 3. The only difference between the structures of beamformers 300 and 400 is that beamformer 400 performs time delay processing three times through first to third delay sections 33, 37, 40 and twice performs pulse-compression through first and second pulse compressor sections 36, 39. More specifically, second adder section 38 is comprised of two second adders, each of which adds the output signals from either two groups G5, G6 or two groups G7, G8. Second pulse compressor section 39 pulse-compresses the added signals from second adder section 38. Third delay section 40 performs time delay processing upon the output signals from second pulse compressor section 39. Lastly, third adder 41 generates a receive-focused signal by adding the output signals from third delay section 40.

In terms of operation, beamformer 400 of FIGS. 4A and 4B first compensates for the differences in time delay among the groups by means of second delay section 37. Beamformer 400 further compensates for the differences in time delay between the groups at the next level by means of third delay section 40. In other words, pulse compression occurs at each hierarchical group level, thereby simplifying the hardware configuration and allowing for more enhanced receive-focusing than beamformer 300 shown in FIG. 3.

Figure 5:
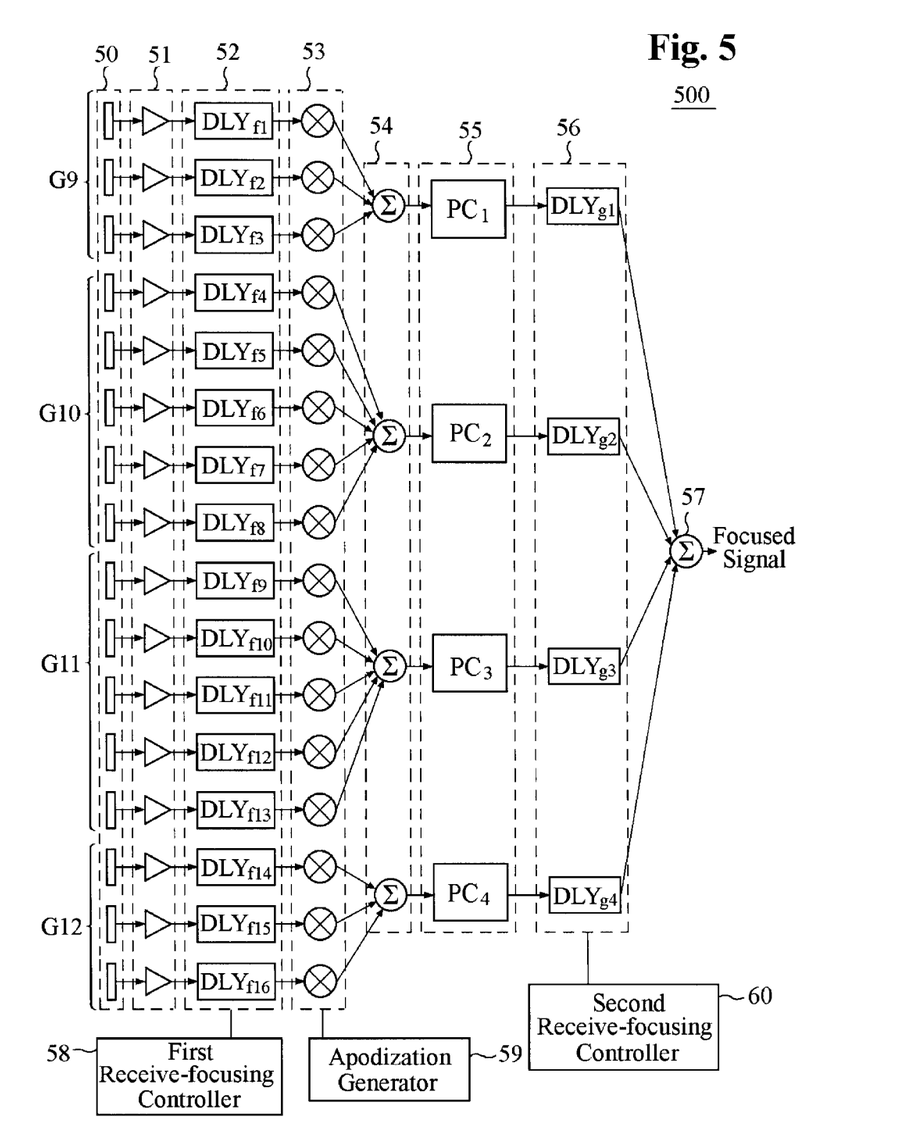
FIG. 5 illustrates a structure of the beamformer of an ultrasound imaging system in accordance with a third embodiment of the present invention, in which each transducer group includes a different number of transducers.

Referring now to FIG. 5, there is shown the structure of a beamformer of an ultrasound imaging system in accordance with a third embodiment of the present invention. The functions of the elements shown in FIG. 5, i.e., transducer array 50, receiver section 51, first delay section 52, apodization section 53, first adder section 54, pulse compressor section 55, and second delay section 56 of FIG. 5 are the same as those of the corresponding elements in FIG. 3. In addition, the overall structure of a beamformer 500 according to this embodiment of the invention is similar to that of FIG. 3. That is, the transducers of beamformer 500 are grouped into a predetermined number of groups, and pulse compressors $PC_1$–$PC_4$ within pulse compressor section 55 are coupled to the outputs from the respective groups, as in FIG. 3. However, there is a minor difference between beamformer 500 of FIG. 5 and beamformer 300 of FIG. 3 in that the latter includes the same number of transducers in each group of transducer array 20, while the former includes a different number of transducers in each group of transducer array 50. In the third embodiment, two inner groups G10, G11 include five transducers, while outer groups G9, G12 include three transducers. The reason why the transducers are grouped in different numbers is explained below.

Among the outer transducers within transducer array 50, the focusing-delay differences are relatively high and the amounts of variations in the focusing-delay differences with respect to time are relatively large. As a result, the differences in terms of the warping of the time axis become large among adjacent transducers. Therefore, in order for the outer transducers not to degrade the image quality, a relatively small number of transducers should be included in the outer group of transducer array 50. In contrast, the inner transducers positioned near the center of transducer array 50 have relatively low focusing-delay differences among each other, and the focusing delay differences do not vary much with time. The differences in terms of the warping of the time axis are small among adjacent transducers. Therefore, in order to improve the image quality, a relatively large number of transducers should be included in the inner group of transducer array 50.

Alternatively, the structure of FIG. 5 may be expanded in cascade as in FIG. 4 to form a multi-stage configuration. If a multi-stage configuration is formed in FIG. 5, the required hardware increases but the image quality may be improved as compared to the one-stage configuration as shown in FIG. 5.

As described above, the inventive ultrasound imaging system is structured such that the transducers within the transducer array are grouped into a few number of groups to enable the multi-stage time delaying and multi-stage pulse compression processing. According to the invention, therefore, the time delay of each transducer can be accurately computed to finely receive-focus the ultrasound signals. The inventive ultrasound imaging system can be implemented with a small number of delay elements and pulse compressors, thereby reducing the size of a memory space required for the system and making the entire hardware structure simple and efficient. In addition, the inventive ultrasound imaging system improves the frame rate without sacrificing the image quality, and lends itself to manufacturing at the reduced costs.

While the present invention has been shown and described with respect to the particular embodiments, it will be apparent to those skilled in the art that many changes and modifications may be made without departing from the spirit and scope of the invention as defined in the appended claims.

What is claimed is:

1. An ultrasound imaging system for forming an ultrasound image comprising:
    a transducer array for converting incoming ultrasound signals into electric signals, wherein said transducer array is divided into a number, N, of transducer groups each including a number, M, of transducers wherein M and N are integers greater than 1;
    A number, N, of first delay groups, including a number, M, of first delay elements for delaying the electric signals from the transducers by a first time delay, wherein the first delay elements are connected to the respective transducers;
    A number, N, of first adders for adding the number, M, of delayed signals from the first delay group;
    A number, N, of pulse compressors connected to the number, N, of first adders for pulse-compressing the added signals from the first adders;
    A number, N, of second delay elements connected to the number, N, of pulse compressors for delaying the pulse-compressed signals by a second time delay; and
    at least one second adder for adding the delayed signals from the second delay elements.

2. The ultrasound imaging system of claim 1, further comprising:
    a receiver section coupled to said transducer array for amplifying the output signals from the transducer array and converting the output signals into digital signals; and
    an apodization section coupled between the number, N, of first delay groups and the number, N, of first adders for multiplying predetermined apodization coefficients to the output signals from the respective first delay elements.

3. The ultrasound imaging system of claim 1, further comprising:
    second pulse compressors connected to the second adders for pulse-compressing the added signals from the second adders;
    third delay elements respectively connected to the second pulse compressors for delaying the pulse-compressed signals from the second pulse compressors by a third time delay; and
    a third adder for adding the delayed signals from the third delay elements.

4. The ultrasound imaging system of claim 1, further comprising:
    a first receive-focusing controller coupled to said number, N, of first delay groups for calculating and storing the first time delay based on relative locations of the transducers.

5. The ultrasound imaging system of claim 1, further comprising:
    a second receive-focusing controller coupled to said number, N, of second delay elements for calculating and storing the second time delay for compensating differences in time delay between the first delay groups.

6. The ultrasound imaging system of claim 2, wherein said apodization section comprises an apodization generator for storing the predetermined apodization coefficients, wherein said apodization coefficients are determined according to apodization curve pattern data.

7. An ultrasound imaging system for forming an ultrasound image, comprising:
   means for grouping incoming ultrasound signals into a predetermined number of groups; and
   means for processing the grouped ultrasound signals via multi-stage pulse-compression and multi-stage time delaying processes so as to generate focused ultrasound signals.

8. The ultrasound imaging system of claim 7, wherein the grouped ultrasound signals pass through at least one adder, at least one pulse compressor, and at least one delay element.

9. The ultrasound imaging system of claim 7, wherein said groups provide a different number of ultrasound signal paths.

10. An ultrasound imaging method for forming an ultrasound image, comprising the steps of:
   transmitting ultrasound signals towards a target object using a transducer array, wherein said transmitted ultrasound signals are reflected from the target object;
   receiving the reflected ultrasound signals;
   dividing the received ultrasound signals into a number, N, of groups, in which N is an integer more than 1; and
   time-delaying and pulse-compressing the signals from the number, N, of groups.

11. The ultrasound imaging method of claim 10, wherein said step of dividing comprises dividing the received ultrasound signals such that one of the number, N, of groups includes a different number of ultrasound signal paths from another group.

12. An ultrasound imaging system for forming an ultrasound image, comprising:
   a transducer array for converting incoming ultrasound signals into electric signals, wherein said transducer array is divided into a plurality of transducer groups each including a plurality of transducers;
   a plurality of first delay groups including a plurality of first delay elements for delaying the electric signals from the transducers by a first time delay, wherein said first delay elements are connected to the transducers;
   a plurality of first adders for adding the delayed signals from the respective first delay group;
   a plurality of pulse compressors connected to the plurality of first adders for pulse-compressing the added signals from the first adders;
   a plurality of second delay elements connected to the plurality of pulse compressors for delaying the pulse-compressed signals by a second time delay; and
   at least one second adder for adding the delayed signals from the second delay elements.

* * * * *